US007793347B2

(12) United States Patent
Rozas

(10) Patent No.: US 7,793,347 B2
(45) Date of Patent: Sep. 7, 2010

(54) METHOD AND SYSTEM FOR VALIDATING A COMPUTER SYSTEM

(76) Inventor: Guillermo J. Rozas, 104 Magneson Ter., Los Gatos, CA (US) 95032

( * ) Notice: Subject to any disclaimer, the term of this patent is extended or adjusted under 35 U.S.C. 154(b) by 1236 days.

(21) Appl. No.: 11/053,080

(22) Filed: Feb. 7, 2005

(65) Prior Publication Data

US 2006/0179483 A1 Aug. 10, 2006

(51) Int. Cl.
*G06F 11/00* (2006.01)
(52) U.S. Cl. ...................................................... 726/22
(58) Field of Classification Search .................. 726/22, 726/23, 24; 713/1, 164, 189, 193, 165, 167, 713/176
See application file for complete search history.

(56) References Cited

U.S. PATENT DOCUMENTS

| | | | |
|---|---|---|---|
| 4,401,208 A | 8/1983 | Allmacher, Jr. | |
| 5,379,342 A | 1/1995 | Arnold et al. | |
| 5,421,006 A | 5/1995 | Jablon et al. | |
| 5,963,738 A | 10/1999 | Yamaki et al. | |
| 6,185,678 B1 | 2/2001 | Arbaugh et al. | |
| 6,356,529 B1 | 3/2002 | Zarom | |
| 6,401,208 B2 | 6/2002 | Davis et al. | |
| 6,519,552 B1 * | 2/2003 | Sampath et al. | 702/183 |
| 6,625,730 B1 | 9/2003 | Angelo et al. | |
| 6,711,675 B1 * | 3/2004 | Spiegel et al. | 713/2 |
| 7,231,512 B2 | 6/2007 | Rothman | |
| 7,237,126 B2 * | 6/2007 | Neufeld | 713/194 |
| 7,308,714 B2 * | 12/2007 | Bardsley et al. | 726/23 |
| 7,340,638 B2 * | 3/2008 | Nicholson et al. | 714/6 |
| 7,430,658 B2 * | 9/2008 | Ryser | 713/1 |
| 2004/0003226 A1 * | 1/2004 | Collins et al. | 713/2 |
| 2004/0059917 A1 * | 3/2004 | Powers | 713/176 |
| 2004/0064457 A1 | 4/2004 | Zimmer et al. | |
| 2005/0021968 A1 | 1/2005 | Zimmer et al. | |
| 2005/0108564 A1 | 5/2005 | Freeman et al. | |

FOREIGN PATENT DOCUMENTS

| | | |
|---|---|---|
| KR | 2000-0025197 | 5/2000 |
| KR | 2000-0061449 | 10/2000 |
| KR | 2002-0007090 | 1/2002 |
| WO | 0159564 | 8/2001 |

OTHER PUBLICATIONS

Non Final Office Action, Mail Date Mar. 3, 2009; U.S. Appl. No. 11/053,081.
Final Office Action, Mail Date Oct. 26, 2009; U.S. Appl. No. 11/053,081.
Final Office Action, Mail Date Nov. 6, 2008; U.S. Appl. No. 11/053,081.
Non Final Office Action, Mail Date Feb. 25, 2008; U.S. Appl. No. 11/053,081.
Pentium Pro Family Developer'S Manual, vol. 3: Operating System Guide, Intel 242692, Revision 1.0, Dec. 1995, Chapter 9, pp. 1-15.
International Preliminary Report, Mail Date Aug. 7, 2007.
International Search Report and Written Opinion, Mail Date Jun. 19, 2006.
First Office Action; Mail Mail Date Aug. 21, 2009; Application No.: 2006800088798.
Final Office Action; Mail Date Feb. 1, 2010; U.S. Appl. No. 11/053,081.
Office Action Dated Apr. 19, 2010; U.S. Appl. No. 11/053,081.

* cited by examiner

*Primary Examiner*—Beemnet W Dada

(57) ABSTRACT

Validating a computer system. An integrity check program is declared during booting of the computer system. It is determined whether the integrity check program quasi-periodically validates dynamic data structures of an operating system within a time interval.

49 Claims, 5 Drawing Sheets

US 7,793,347 B2

METHOD AND SYSTEM FOR VALIDATING A COMPUTER SYSTEM

FIELD OF THE INVENTION

The present invention relates to the field of computer systems. Specifically, embodiments of the present invention relate to a method and system for validating a computer system.

BACKGROUND ART

Operating systems are under risk of subversion by viruses and other malicious agents. A subverted operating system may lose control of machine resources and be unable to enforce its design parameters. For example, once an operating system is subverted, it can be replaced by another operating system, or essential features of the operating system may be bypassed or otherwise rendered inactive or corrupted. Thus, a need exists for detecting a validating a computer system.

SUMMARY OF THE INVENTION

Embodiments of the present invention provide methods and systems of validating a computer system. One embodiment of the present invention is a method of operating a computer system. The method comprises declaring an integrity check program during booting of the computer system. The method further comprises determining whether the integrity check program quasi-periodically validates operating system dynamic data structures within a time interval.

Another embodiment in accordance with the present invention is a method of operating a computer system. The method comprises clearing a detection bit in response to entrance of an integrity check program at a pre-determined entry point. The integrity check program integrity check program is operable to validate dynamic data structures of an operating system. The detection bit is set in response to a pre-determined event occurring during execution of the integrity check program. If the detection bit is clear upon exiting the integrity check program at a pre-determined exit point, then the timer is re-set.

Yet another embodiment in accordance with the present invention is a computer system. The computer system comprises a secure timer. The computer system also has security logic coupled to the timer and operable to determine successful execution of an integrity check program for validating dynamic data structures of an operating system. The security logic is also able to reset the timer if the integrity check program completes successfully.

Still another embodiment of the present invention is a method of operating a computer system. In this embodiment, the method comprises declaring an integrity check program at a time when an operating system is trusted. The method further comprises determining whether the integrity check program quasi-periodically validates dynamic data structures of the operating system within a time interval.

DETAILED DESCRIPTION OF THE INVENTION

Figure 1:
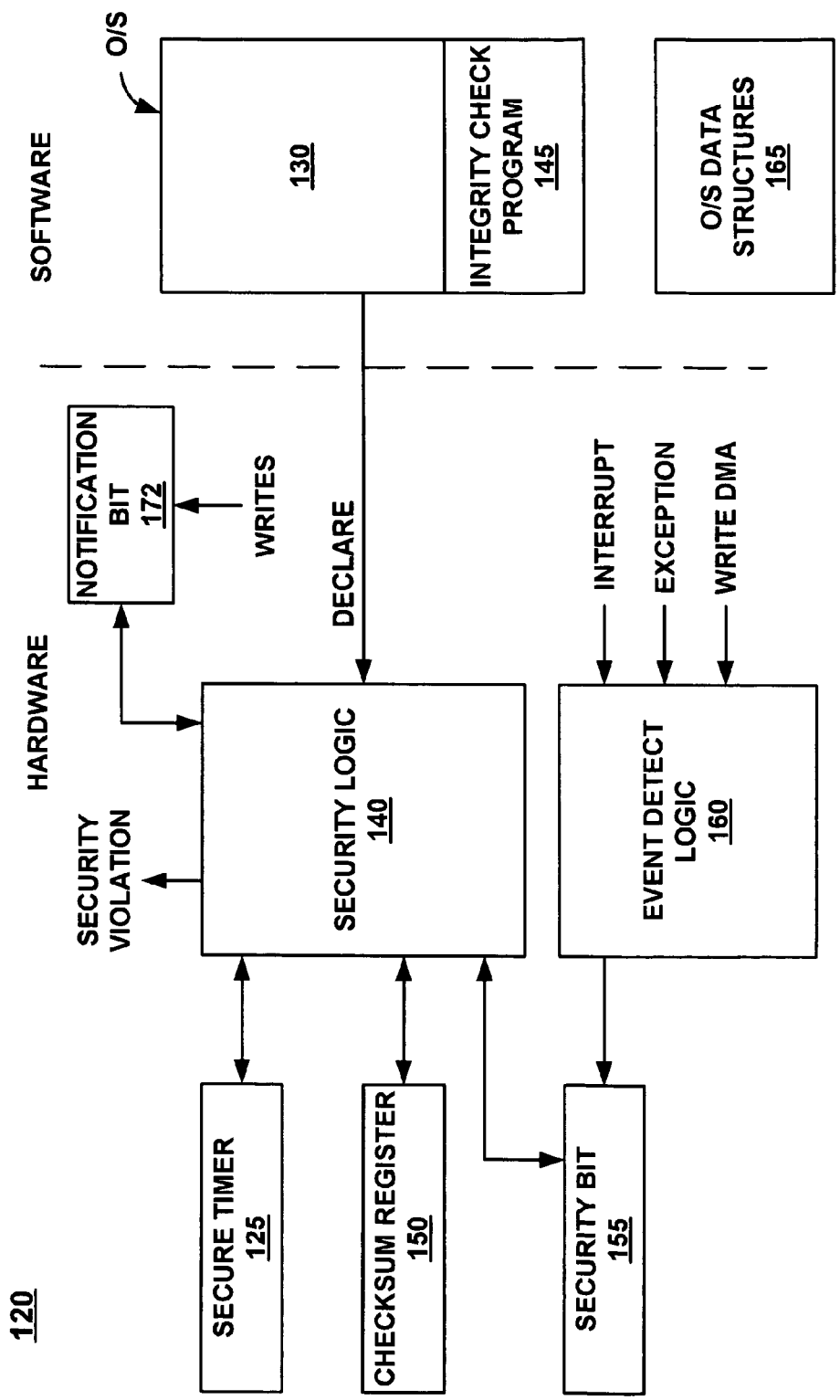
FIG. 1 is a diagram of hardware and software for validating a computer system in accordance with an embodiment of the present invention.

In the following detailed description of embodiments of the present invention, a method and system of validating a computer system, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "declaring" or "setting" or "clearing" or "providing" or "booting" or "processing" or "computing" or "responding" or "calculating" or "determining" or "detecting" or "storing" or "outputting" or "returning" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Therefore, it would be advantageous to provide a method and system for validating an operating system. It would be further advantageous to take corrective action if the validation determines possible subversion of the operating system. Embodiments of the present invention provide a method and system for validating an operating system. Embodiments of the present invention provide a method and system for detecting that an operating system has been subverted. Embodiments of the present invention provide a method and system that take corrective action upon detecting a subverted operating system. Embodiments of the present invention provide these advantages and others not specifically mentioned above but described in the sections to follow.

In accordance with embodiments of the present invention, the operating system (O/S) comprises an integrity check program that may check that certain O/S dynamic data structures are consistent and unmodified. The operating system declares the integrity check program to security logic at a time when the O/S is trusted, such as during a secure system boot. However, to detect possible later subversion of the O/S, the operating system quasi-periodically executes the integrity check program. As used herein, the term quasi-periodically means that an event occurs at some point in each of a series of periods, but not necessarily at the same point in each period. Thus, the spacing between events may or may not be uniform. If the integrity check program fails to quasi-periodically successfully execute, it is assumed that the operating system has been compromised. Thus, the computer system may be shut down or other appropriate corrective action may be taken.

In one embodiment, the security logic stores a secure timer for keeping track of periodic intervals in which the integrity check program generally should be successfully executed. In this embodiment, the hardware only resets the timer if the integrity check program successfully completes. Completion may be deemed unsuccessful if certain pre-determined events occur while the integrity checker is executing. Those events may include exceptions, interrupts, and write DMAs. Successful completion may also include the integrity checker validating dynamic data structures of the O/S. If the timer expires, corrective action is taken. In one embodiment, the security logic stores a checksum for authenticating the integrity check program upon its invocation. The checksum is stored when the O/S declares the integrity check program at system boot and cannot be altered thereafter.

FIG. 1 is a diagram 120 of hardware and software for validating a computer system in accordance with an embodiment of the present invention. The hardware includes a secure one-time programmable timer 125. For example, the timer's period can be established only once per time the computer system is booted. In one embodiment, the operating system 130 programs the timer period by writing to a write-once register. The security logic 140 resets the secure timer if the integrity checking program 145 successfully completes, thus preventing a system shut-down or other corrective action due to the secure timer expiring.

The hardware also has a checksum register 150 that stores a checksum of the integrity checking code and data. The security logic 140 computes and stores this checksum when the computer system boots or at another trusted time, and the checksum value is unchangeable thereafter. When the integrity check program 145 is invoked, the security logic 140 verifies the checksum. In one embodiment, the checksum register 150 is a write once register. For computing the checksum, the security logic 140 has a cryptographically secure checksum/hashing algorithm in one embodiment. Although any process may be used, the checksum/hashing algorithm may be compliant with the Secure Hash Algorithm Version 1 (SHA-1) or higher, in one embodiment.

The hardware also has a memory unit (e.g., register, flip-flop, etc.) that is used to store an integrity or security bit 155. This bit is writeable only by the security logic 140 and is used for accounting whether the integrity check program 145 has successfully completed. This bit enables the security logic 140 to identify successful completion of the integrity check program 145, wherein the secure timer 125 is reset. The security bit 155 is not directly observable in software, in one embodiment.

The integrity check program 145 generally must execute without interrupts and exceptions, in one embodiment. Further, writes by agents other than the integrity check program 145 are not permitted, in one embodiment. Therefore, the hardware also has event detection logic 160, which determines whether one or a number of pre-determined events (or event types) occurs during the execution of the integrity check program. The events may include interrupts, exceptions, and DMA writes to certain memory locations. However, the present invention is not limited to these events.

The integrity check program 145 of FIG. 1 is typically a part of the O/S 130, although it could be a part of another program or a stand alone program. The integrity check program 145 serves as a quasi-periodic root of trust, as opposed to the original root of trust that occurs at system boot or at another time that serves as the original root of trust. The present invention allows great latitude in how the integrity check program 145 verifies the integrity of the operating system 130. Thus, the integrity check program 145 may be O/S dependent. Typically, the integrity check program 145 may be used to confirm that dynamic O/S data structures 165 have not been compromised. Those dynamic data structures may include, but are not limited to, interrupt tables, exception tables, paging registers and structures, and segmentation structures. A technique to check the integrity of the structures is a cryptographic checksum; however, the present invention is not limited to this technique.

Once memory management and timer interrupts are known to be secure, further security checks for other O/S functions may be performed by code other than the integrity check program. The implementation of these further checks is up to the O/S. Thus, embodiments of the present invention detect if the O/S has been subverted or not, which allows further security checks to piggyback off from this security.

FIG. 1 also depicts a notification bit 172 that is set when certain regions of memory are written. The sticky notification bit informs the integrity check program that a write has occurred to this region of memory and can only be cleared by the integrity check program when in integrity check mode. The notification bit 172 will be described in more detail below herein.

Figure 2:
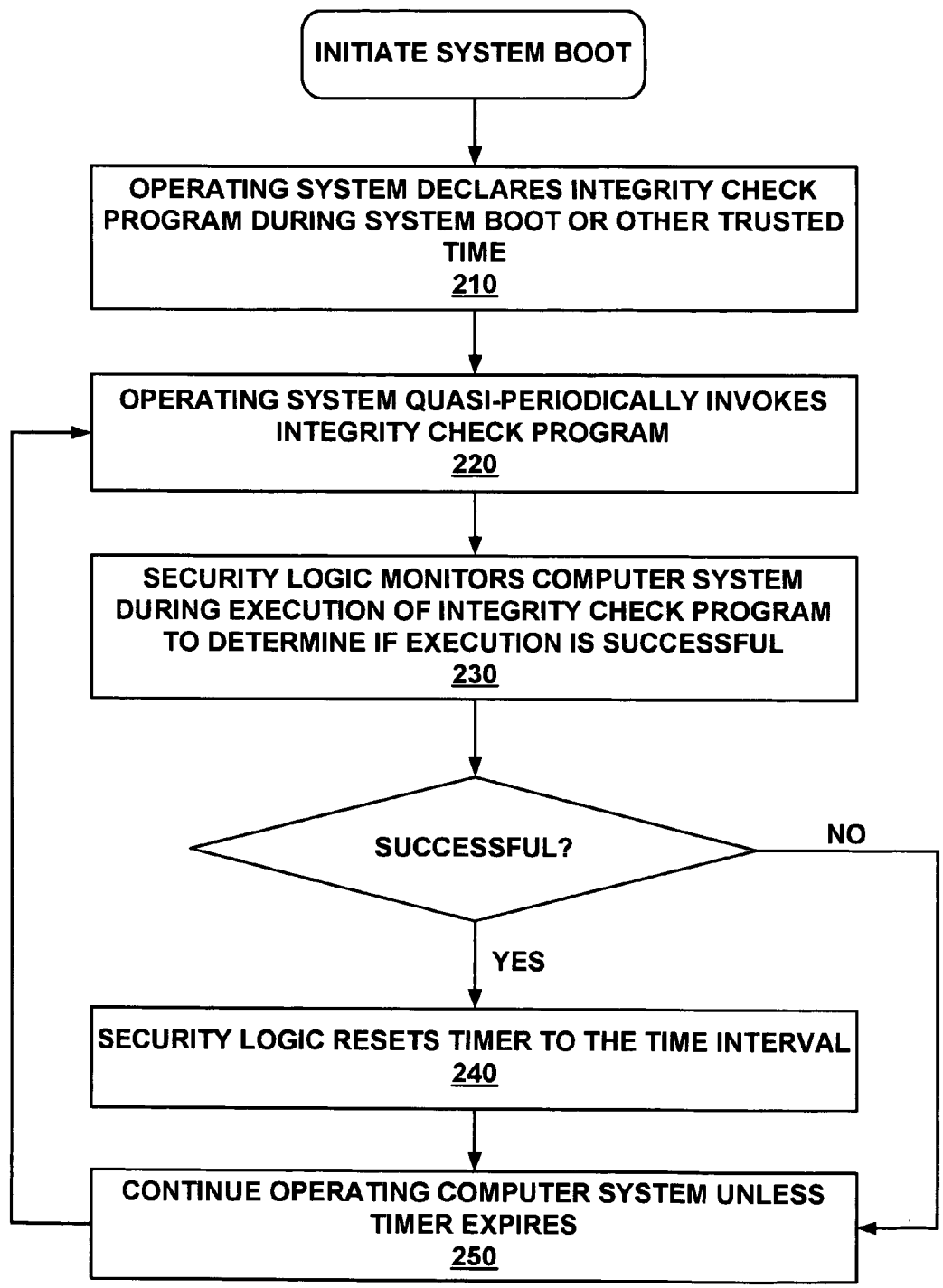
FIG. 2 is a flowchart illustrating a process of operating a computer system in accordance with an embodiment of the present invention.

FIG. 2 is a flowchart illustrating a computer-controlled process 200 of operating a computer system in accordance with an embodiment of the present invention. In step 210, the operating system declares an integrity check program during booting of the computer system or another time at which the O/S is trusted. In one embodiment, it is assumed that the operating system can be trusted during booting of the computer system. In other words, the operating system that runs at system boot is not subverted other otherwise compromised.

One technique providing for secure booting of a computer system is described in co-pending U.S. patent application Ser. No. 11/053,081, to Morgan et al., entitled, System and method for providing a secure boot architecture, and filed on Feb. 7, 2005, which is incorporated herein in its entirety. Another technique providing for an operating system that can be trusted during bootup is booting the computer system from a CD-ROM. Although either technique can be used, the present invention is not limited to these techniques for assuring that the operating system is trusted during system boot.

Declaring the integrity check program may comprise the operating system providing a pointer to the start of the integrity check program, as well as its size. One technique for the operating system to declare the integrity check program is to execute an instruction that makes this information available to the security logic. The instruction may be a special instruction that is only executable once after initiating system boot. Another technique for the operating system to declare the integrity check program is to write a register that can be written only once per time the computer system is booted.

The operating system is aware of the timer period such that is can initiate execution of the integrity check program within the timer period. Step 210 may comprise the operating system declaring a timer value to establish this period. Declaring the timer period may be achieved by writing to a write one register. Alternatively, the operating system may access the timer period from a register or memory location. The timer period can be hard coded such that it is unalterable even across system boots. The integrity check logic has responsibility for re-setting the timer upon successful completion of the integrity check program.

Step 220 of FIG. 2 is the operating system invoking the integrity check program. The integrity check program may comprise an entrance instruction, an exit instruction, and a number of instructions therebetween that may be used to check the integrity of the operating system. Invoking the integrity check program may comprise the operating system causing the entrance instruction to be executed. The entrance instruction may put the operating system into an integrity-checking mode. In this mode, the operating system has responsibility for not raising exceptions and for not allowing interrupts to be processed.

However, it is not required that an entrance instruction and an exit instruction be used to demarcate the boundaries of the integrity check program. Alternatively, the security check logic is provided, or can derive, the start and end address of the integrity check code from information provided by operating system at system boot. The security check logic still needs to be informed that the integrity check program is being executed, however. The operating system can indicate this to the security check logic in any suitable manner.

Step 230 is the security check logic monitoring the computer system during the execution of the integrity check program to determine if the integrity check program completes successfully. For example, the security check logic monitors for certain pre-determined events, such as interrupts, exceptions, and write DMAs. If such an event occurs, the execution of the integrity check program is deemed unsuccessful, in one embodiment. Step 230 is not limited to such monitoring. Details of one embodiment of step 230 are presented in the process 300 depicted in FIG. 3.

If the integrity check program completes successfully, the security check logic resets the timer in step 240. As previously mentioned, the integrity check program may end with an exit instruction. The exit instruction cues the security check logic to check for successful completion. Alternatively, the security check logic knows or derives the end address of the integrity check program from information provided at system boot. Moreover, as previously discussed, the integrity check program may validate certain dynamic data structures of the O/S. Should this validation fail, the integrity check program may inform the security check logic or it may respond to the failed validation on its own accord.

After the integrity check program completes, the operating system returns to normal mode in which no constraints are placed on interrupts and exceptions by the present invention. If at any point, the timer expires, appropriate corrective action is taken. Appropriate corrective action includes, but is not limited to, shutting down the computer and informing the user. The timer is not stayed during execution of the integrity check program. Therefore, even if the timer expires during said execution, the corrective action is taken.

Figure 3:
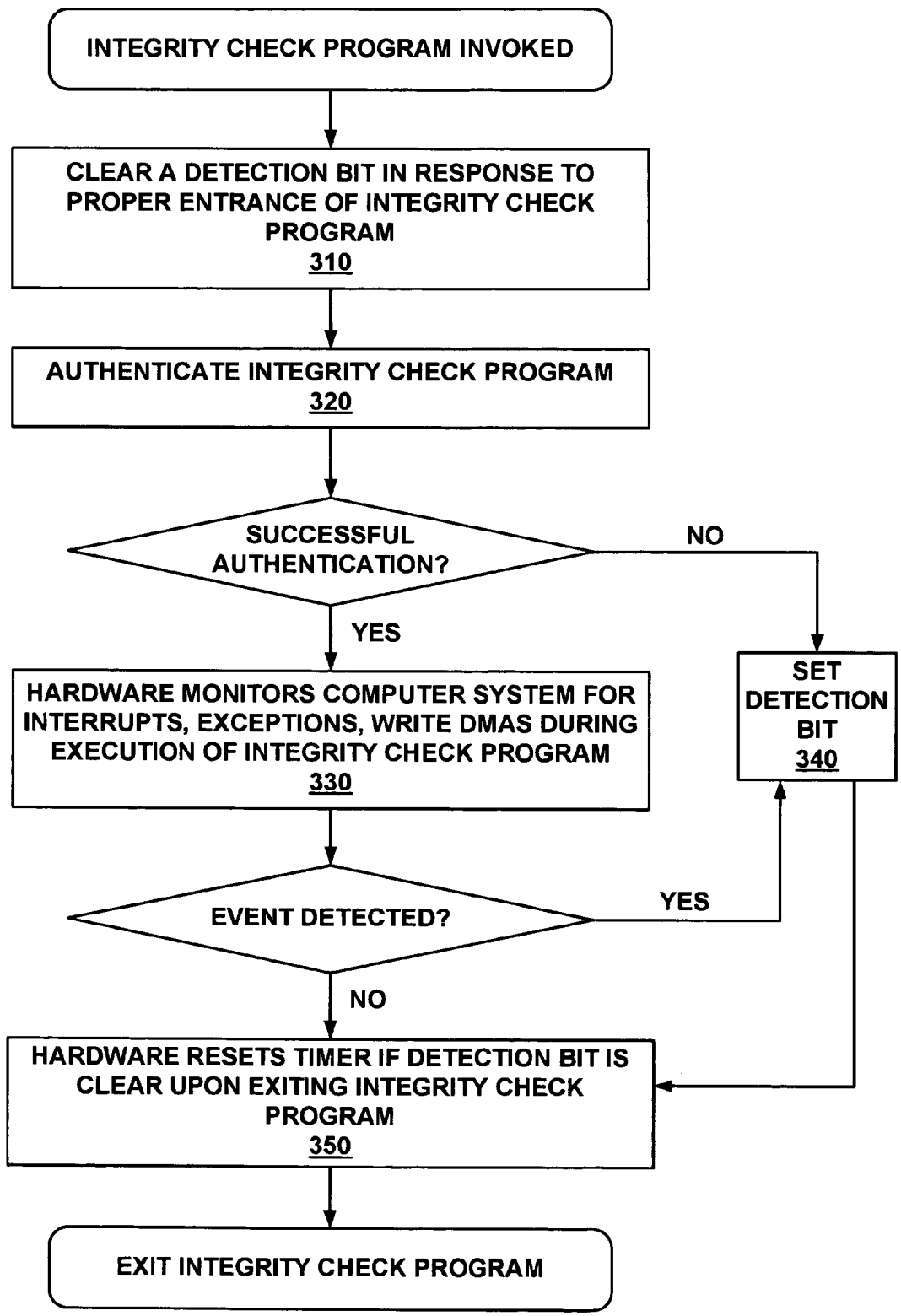
FIG. 3 is a flowchart illustrating a process occurring during executing an integrity check program in accordance with an embodiment of the present invention.

FIG. 3 is a flowchart illustrating a computer-controlled process 300 of determining if an integrity check program executes successfully, in accordance with an embodiment of the present invention. Steps of process 300 are performed by hardware depicted in FIG. 2, in accordance with one embodiment. The process 300 begins by the integrity check program being invoked by the operating system. In step 310, the hardware sets a detection bit to indicate a first state, such as "successful completion" in response to proper entrance of the integrity check code. The security hardware will change this bit to a second state such as, "unsuccessful completion" upon detection of certain events. The determination of whether to reset the security timer is based on the state of this bit. The integrity check program has a pre-determined entrance point. If the program is entered at any other point, the hardware will not reset the timer regardless of how the integrity check program executes.

In step 320, the integrity check program itself is authenticated to verify that it has not been tampered with. The authentication may be performed by computing a checksum of the integrity check program in its current state and comparing with a checksum stored at system boot. However, it is not required that the checksum be performed every time that the integrity check program is executed. Alternatively, the processor can monitor whether the integrity check program has potentially been modified since the last time the checksum authentication was performed. This monitoring may include monitoring cache lines and page table mappings associated with the region of memory comprising the integrity check program. If this monitoring indicates potential tampering with the integrity check program, then the checksum authentication is performed. In one embodiment, to facilitate the authentication, the integrity check program fits into a number of memory pages that can be pinned in the translation lookaside buffer (TLB) from entry to exit.

If the checksum test fails, then the detection bit is set to a state such as, "unsuccessful completion." Once the detection bit is set to this state, it cannot be set to successful completion unless the integrity check program is properly invoked, as described in step 310. Typically, execution would jump to the end of the integrity check program if authentication fails; however, this is not required in all cases.

If the checksum test passes, then no action is taken with respect to the detection bit and execution of the integrity check program continues in step 330. During execution of the integrity check program, the hardware monitors for events including unblocked interrupts, exceptions, and writes to certain regions of memory or writes by agents other than the integrity check program. As previously discussed, the operating system has the responsibility of ensuring that no interrupts are taken (e.g., blocking interrupts) and that it raises no exceptions during execution of the integrity check program. Should execution of the integrity check program be interrupted or if an exception occurs during execution of the integrity check program, then the hardware sets the detection bit. Since the bit should not be cleared again during remaining execution of the integrity check program, the integrity check program will finish unsuccessfully.

The aforementioned prohibited write would typically involve cache lines associated with the integrity check program when the processor is in integrity check mode, but is not limited thereto. This write prohibition applies to writing by any agent other than the security check program, for example, another processor in a simultaneous multi-processor (SMP)

or a direct memory access (DMA). Reads of the integrity check program need not be prohibited.

Furthermore, execution of the integrity check program is not allowed to branch outside of its code. Therefore, should this occur, the hardware sets the detection bit to unsuccessful execution. However, the integrity check program is allowed to access memory external to itself.

In step 340, the hardware resets the secure timer to start a new time interval if the detection bit indicates successful completion of the integrity check program upon exit. Resetting the timer thus serves as a "stay of execution." However, the operating system will need to re-invoke the integrity check program again for successfully completion prior to the timer's next expiration. Note that if execution of the integrity check program branches out of the integrity check program, the secure timer will not be reset.

Figure 4:
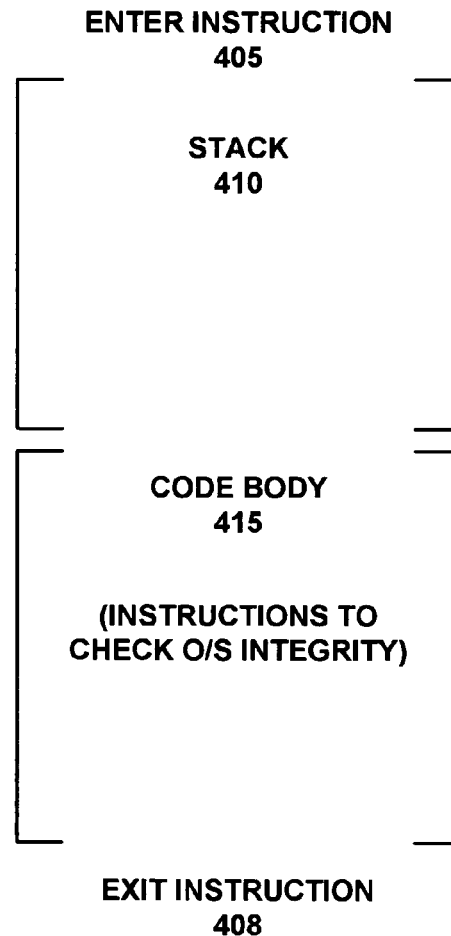
FIG. 4 is a diagram illustrating an exemplary integrity checking program in accordance with an embodiment of the present invention.

FIG. 4 depicts an exemplary integrity check program 400, in accordance with one embodiment of the present invention. The exemplary program starts with an "enter into integrity-check mode" instruction 405 and ends with an "exit integrity-check mode" instruction 408. The code body instructions 415 therebetween may be whatever instructions are suitable for checking integrity of the operating system. As previously discussed, the entrance and exit instructions are not required so long as the security logic knows the boundaries of the integrity check program 400 and knows that it has been invoked.

The integrity check program has an internal stack 410 in the embodiment of FIG. 4. The internal stack is set to a default value at the conclusion of the execution of the program such that the checksum authentication will pass upon the next execution. In general, the integrity check program may modify its own data structures and code, so long as default values are re-established upon successful completion of the program.

The integrity check program is free to access data (read and write) external to itself. In one embodiment, the integrity check program has an external stack, which is write protected during execution of the integrity check program. Any attempt by any entity other than the integrity check program to write to the external stack results in the security bit being set to a value that indicates unsuccessful execution of the integrity check program.

As previously discussed, it is assumed that the O/S can be trusted at some point in time, for example, when the computer system is booted. Furthermore, the integrity of the O/S is quasi-periodically re-determined by requiring the integrity check program to successfully execute within a defined time interval. However, there may be a possibility that a malicious agent (e.g., virus) could set up a cycle of subverting the O/S after the integrity check program successfully executes, restoring the proper O/S in time for the integrity check program to successfully execute prior to the timer's next expiration, and re-subverting the O/S after the integrity check program again successfully executes.

For example, a malicious agent might subvert the O/S and set up a future DMA write to occur after the integrity check program has successfully executed. Then, the malicious agent would restore the integrity of the O/S in time for the integrity check program to successfully execute. The write DMA that occurs after the integrity check program successfully executes would allow the malicious agent to re-subvert the O/S and start the cycle over. A similar issue occurs in an SMP system if the O/S executes the integrity check program in only one CPU or thread within the CPU.

The following describes several ways to handle this potential future subversion. In one embodiment, pre-determined regions of memory are write protected so that writes cannot occur from the CPU(s) or DMA. Those regions of memory may be established at a time when the operating system is trusted, such as during a secure computer system boot.

Another embodiment provides for write monitoring of certain regions of memory to prevent subversion. Those regions of memory may be established at a time when the operating system is trusted, such as during a secure computer system boot. The present embodiment allows writes to those regions, but tracks them with a sticky notification bit, which is accessible by the security logic. The sticky notification bit informs the integrity check program that a write has occurred to this region of memory and can only be cleared by the integrity check program when in integrity check mode. Even if a write occurs to a monitored region, the integrity check program can clear the notification bit if the write is deemed to be a trusted write. For example, the O/S may associate a cryptographic signature with a modification of its own code. The integrity check code can verify the cryptographic signature to learn that the modification is trusted, wherein the sticky notification bit is re-set.

Yet another embodiment for handling the potential future subversion is to make execution of the integrity check program to be a barrier synchronization event. For example, all agents that can write to memory have roles during the execution of the integrity check program and must be in a known state to execute the integrity check program correctly.

In an SMP system, barrier synchronization can be achieved by having the integrity check program execute on all CPUs/threads, or on a subset (e.g., one) of the CPUs/threads with the remaining CPUs/threads halted in such a way that their future work is determined by the CPU/thread that is running the integrity checker program. In other words, any processor not executing the integrity check program is halted in a way that its future work is determined by the CPU/thread running the integrity check program. Thus, in one embodiment one CPU/thread executes the integrity check program and the rest are halted in the previously stated fashion. In another embodiment, all of the CPUs/threads enter the integrity check program at the same time.

In one embodiment, the CPUs/threads not executing the integrity check program are halted waiting on a "work queue" or similar semaphore such that the work queue or semaphore will only be written by the CPU/thread running the integrity check program. In another embodiment, the CPUs/threads not executing the integrity check program are shut down by the CPU/thread running the integrity check program until the integrity check program runs to completion and the O/S re-awakens/resets the other CPUs/threads.

In still another embodiment, the CPUs/threads not executing the integrity check program are halted in such a way that only an inter-processor interrupt to a known address is able to wake them up. The integrity check program would verify the integrity of the code at that known address before allowing the other CPUs/threads to restart.

Other implementations are possible for halting the CPUs/threads that do not execute the integrity check program and only allowing them to re-start execution in a known state, as opposed to an arbitrary state.

In another embodiment, the O/S enforces a rule that DMA-capable devices are not allowed to have any pending writes when the O/S invokes the integrity check program. Thus, the O/S only invokes the integrity check program when it does not have any DMA writes pending. The integrity check program verifies the state of DMA capable devices upon its invocation. For example, DMA-capable devices can have an idle or 'parked' state that can be forced from the CPU such that they dismiss all prior pending memory writes. The integrity check program can then force all such devices to be 'parked' upon entry, and then proceed with the integrity check. Therefore, a malicious agent that attempts to schedule a DMA to overwrite the O/S after the integrity check completes would be thwarted, as its scheduled writes to memory would be dismissed.

Figure 5:
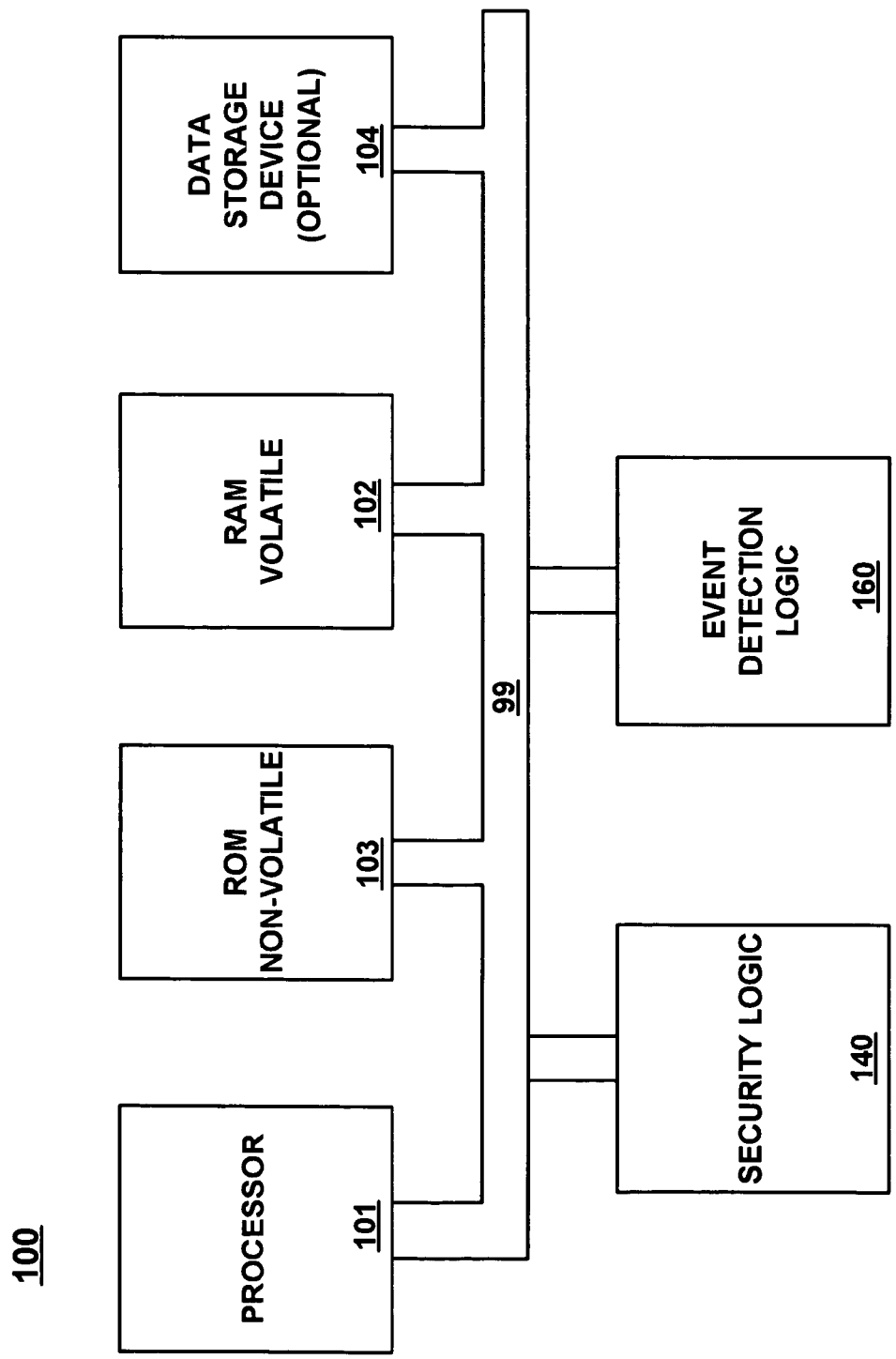
FIG. 5 is an exemplary computer system that may serve as a platform upon which embodiments of the present invention may be executed.

FIG. 5 illustrates circuitry of an exemplary computer system 100, which may form a platform for embodiments of the present invention. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101.

The security logic 140 is coupled to the bus 99 for receiving information from the operating system and for providing a security violation notification. The event detection logic 160 is coupled to the bus 99 for detecting various events. The computer system 100 may also include an optional data storage device 104 (e.g., a magnetic or optical disk and disk drive) coupled with the bus 99 for storing information and instructions. For example, in one embodiment, the operating system is booted from a CD-ROM device.

The preferred embodiment of the present invention, a method and system of detecting subversion of a computer system, is thus described. While the present invention has been described in particular embodiments, it should be appreciated that the present invention should not be construed as limited by such embodiments, but rather construed according to the below claims.

What is claimed is:

1. A method of operating a computer system comprising:
   setting a detection bit to a first state in response to beginning execution of an integrity check program at a pre-determined entry point in said integrity check program, wherein said integrity check program is operable to validate dynamic data structures of an operating system;
   detecting a pre-determined event occurring during said execution of said integrity check program;
   setting said detection bit to a second state in response to said detecting said pre-determined event; and
   re-setting a timer if said detection bit is in said first state upon exiting said integrity check program at a pre-determined exit point in said integrity check program.

2. The method as in claim 1 further comprising:
   authenticating said integrity check program between said beginning execution and said exiting said integrity check program.

3. The method as in claim 2, wherein said pre-determined event comprises said authenticating said integrity check program indicating authentication failure.

4. The method as in claim 1, wherein said pre-determined event comprises an exception.

5. The method as in claim 1, wherein said pre-determined event comprises execution of said integrity check program being interrupted.

6. The method as in claim 1, wherein said pre-determined event comprises said execution of said integrity check program branching outside said integrity check program.

7. The method as in claim 1, wherein said pre-determined event comprises a write to a pre-determined region of memory.

8. The method as in claim 7, wherein said pre-determined region of memory comprises said integrity check program.

9. The method as in claim 7, wherein said pre-determined region of memory comprises data structures associated with said operating system.

10. The method as in claim 1 further comprising:
    determining that a write has occurred to a pre-determined region of memory;
    determining whether said write is trusted; and
    setting said detection bit to said second state if said write is not trusted.

11. The method as in claim 1 further comprising:
    forcing DMA-capable devices to dismiss prior pending memory writes upon said beginning execution of said integrity check program.

12. A computer system comprising:
    a secure timer;
    security logic coupled to said secure timer and operable to determine successful execution of an integrity check program for validating dynamic data structures of an operating system, wherein said security logic is further operable to reset said secure timer if said integrity check program completes successfully, wherein said security logic is further operable to respond to a proper invocation of said integrity check program by setting a security bit to a first state, wherein said proper invocation comprises beginning execution of said integrity check program at a pre-defined entry point, and wherein said security logic is further operable to set said security bit to a second state responsive to determination of unsuccessful execution of said integrity check program; and
    a memory unit for storing said security bit.

13. The computer system as recited in claim 12, wherein said security logic is further operable to detect a pre-determined event during execution of said integrity check program, and wherein said security logic is operable to determine successful execution based thereon.

14. The computer system as recited in claim 13, wherein said pre-determined event comprises an interrupt.

15. The computer system as recited in claim 13, wherein said pre-determined event comprises an exception.

16. The computer system as recited in claim 13, wherein said pre-determined event comprises a write to said integrity check program.

17. The computer system as recited in claim 13, wherein said pre-determined event comprises a write by an agent other than said integrity check program.

18. The computer system as recited in claim 12 further comprising:
    a one-time programmable memory unit for storing an integrity check value to authenticate said integrity check program.

19. The computer system as recited in claim 18 wherein said security logic is further operable to authenticate said integrity check program with said integrity check value.

20. The computer system as recited in claim 12 wherein said security logic is further operable to reset said secure timer if said security bit is in said first state.

21. The computer system as recited in claim 12 wherein a period of said secure timer is establishable once per boot of said computer system.

22. The computer system as recited in claim 12 wherein said operating system comprises said integrity check program.

23. The computer system as recited in claim 12 wherein said operating system is operable to quasi-periodically invoke said integrity check program within a time interval defined by said secure timer.

24. The computer system as recited in claim 12 wherein said operating system is operable to enforce a rule that prevents interruption of said integrity check program.

25. The computer system as recited in claim 12 wherein said operating system is operable to enforce a rule that no exception is raised during execution of said integrity check program.

26. The computer system as recited in claim 12 wherein said operating system is operable to enforce a rule that DMA-capable are not allowed to have pending writes when the operating system invokes the integrity check program.

27. The computer system as recited in claim 12, further comprising:
a plurality of processors, wherein during execution of said integrity check program any of said plurality of processors that is not executing said integrity check program is halted.

28. A computer system comprising:
a processor and a memory, wherein said memory includes instructions that when executed by said processor implement a method of secure operation of said computer system, said method comprising:
setting a detection bit to a first state in response to beginning execution of an integrity check program at a pre-determined entry point in said integrity check program, wherein said integrity check program is operable to validate dynamic data structures of an operating system;
detecting a pre-determined event occurring during said execution of said integrity check program;
setting said detection bit to a second state in response to said detecting said pre-determined event; and
re-setting a timer only if said detection bit is in said first state upon exiting said integrity check program at a pre-determined exit point in said integrity check program.

29. The computer system as in claim 28, wherein said method further comprises:
authenticating said integrity check program between said beginning execution and said exiting said integrity check program.

30. The computer system as in claim 29, wherein said pre-determined event comprises said authenticating said integrity check program indicating authentication failure.

31. The computer system as in claim 28, wherein said pre-determined event comprises an exception.

32. The computer system as in claim 28, wherein said pre-determined event comprises execution of said integrity check program being interrupted.

33. The computer system as in claim 28, wherein said pre-determined event comprises said execution of said integrity check program branching outside said integrity check program.

34. The computer system as in claim 28, wherein said pre-determined event comprises a write to a pre-determined region of memory.

35. The computer system as in claim 34, wherein said pre-determined region of memory comprises said integrity check program.

36. The computer system as in claim 34, wherein said pre-determined determined region of memory comprises data structures associated with said operating system.

37. The computer system as in claim 28, wherein said method further comprises:
determining that a write has occurred to a pre-determined region of memory;
determining whether said write is trusted; and
setting said detection bit to said second state if said write is not trusted.

38. The computer system as in claim 28, wherein said method further comprises:
forcing DMA-capable devices to dismiss prior pending memory writes upon said beginning execution of said integrity check program.

39. A computer system comprising:
means for setting a detection bit to a first state in response to beginning execution of an integrity check program at a pre-determined entry point in said integrity check program, wherein said integrity check program is operable to validate dynamic data structures of an operating system;
means for detecting a pre-determined event occurring during said execution of said integrity check program;
means for setting said detection bit to a second state in response to said detecting said pre-determined event;
means for re-setting a timer if said detection bit is in said first state upon exiting said integrity check program at a pre-determined exit point in said integrity check program; and
means for storing said detection bit.

40. The computer system as in claim 39 further comprising:
means for authenticating said integrity check program between said beginning execution and said exiting said integrity check program.

41. The computer system as in claim 40, wherein said pre-determined event comprises authenticating said integrity check program indicating authentication failure.

42. The computer system as in claim 39, wherein said pre-determined event comprises an exception.

43. The computer system as in claim 39, wherein said pre-determined event comprises execution of said integrity check program being interrupted.

44. The computer system as in claim 39, wherein said pre-determined event comprises execution of said integrity check program branching outside said integrity check program.

45. The computer system as in claim 39, wherein said pre-determined event comprises a write to a pre-determined region of memory.

46. The computer system as in claim 45, wherein said pre-determined region of memory comprises said integrity check program.

47. The computer system as in claim 45, wherein said pre-determined region of memory comprises data structures associated with said operating system.

48. The computer system as in claim 39 further comprising:
means for determining that a write has occurred to a pre-determined region of memory;
means for determining whether said write is trusted; and
means for setting said detection bit to said second state if said write is not trusted.

49. The computer system as in claim 39 further comprising: means for forcing DMA-capable devices to dismiss prior pending memory writes upon said beginning execution of said integrity check program.

* * * * *